(12) United States Patent
Botte et al.

(10) Patent No.: US 11,945,722 B2
(45) Date of Patent: Apr. 2, 2024

(54) ELECTROCHEMICAL METHOD FOR THE PRODUCTION OF GRAPHENE COMPOSITES AND CELL FOR CONDUCTING THE SAME

(71) Applicant: Ohio University, Athens, OH (US)

(72) Inventors: Gerardine G. Botte, Athens, OH (US); Dan Wang, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 17/567,274

(22) Filed: Jan. 3, 2022

(65) Prior Publication Data
US 2022/0119261 A1 Apr. 21, 2022

Related U.S. Application Data

(62) Division of application No. 16/337,113, filed as application No. PCT/US2017/054010 on Sep. 28, 2017, now Pat. No. 11,242,250.

(60) Provisional application No. 62/400,791, filed on Sep. 28, 2016.

(51) Int. Cl.
| | |
|---|---|
| *C01B 32/184* | (2017.01) |
| *C25B 1/00* | (2021.01) |
| *C25B 9/17* | (2021.01) |
| *C25B 11/031* | (2021.01) |
| *C25B 11/043* | (2021.01) |
| *C25B 11/077* | (2021.01) |

(52) U.S. Cl.
CPC ............. *C01B 32/184* (2017.08); *C25B 1/00* (2013.01); *C25B 9/17* (2021.01); *C25B 11/031* (2021.01); *C25B 11/043* (2021.01); *C25B 11/077* (2021.01)

(58) Field of Classification Search
None
See application file for complete search history.

(56) References Cited

PUBLICATIONS

Feng, X., Chen W., and Yan L., "Electrochemical reduction of bulk graphene oxide materials", RSC Adv., 2016, 6, 80106 (Year: 2016).*

Shaw Yong Toh, Kee Shyuan Loh, Siti Kartom Kamarudin, Wan Ramli Wan Daud, "Graphene production via electrochemical reduction of graphene oxide: Synthesis and characterisation," Chemical Engineering Journal, col. 251, pp. 422-434, 2014 (Year: 2014).*

\* cited by examiner

*Primary Examiner* — Louis J Rufo
(74) *Attorney, Agent, or Firm* — Wood Herron & Evans LLP

(57) ABSTRACT

A method of making an electrically conductive composite includes applying graphene oxide to at least one non-conductive porous substrate and then reducing the graphene oxide to graphene via an electrochemical reaction. An electro-chemical cell for causing a reaction that produces an electrically conductive composite includes a first electrode, a second electrode, an ion conductive medium, electrical current in communication with the first electrode, and an optional third electrode having a known electrode potential. The first electrode contains at least one layered electrocatalyst, which includes at least one non-conductive porous substrate coated with graphene oxide and at least a first and second active metal layer comprising a conductive metal in contact with the non-conductive porous substrate coated with graphene oxide.

9 Claims, 4 Drawing Sheets

ELECTROCHEMICAL METHOD FOR THE PRODUCTION OF GRAPHENE COMPOSITES AND CELL FOR CONDUCTING THE SAME

RELATED APPLICATIONS

This application is a divisional of U.S. patent application Ser. No. 16/337,113, filed Mar. 27, 2019, published as U.S. Patent Publication No. 2020/0031673, which is a U.S. National Phase Application of PCT Application No. PCT/US2017/054010, filed Sep. 28, 2017, published as WO 2018/064333, which claims benefit of U.S. Provisional Patent Application No. 62/400,791, filed Sep. 28, 2016. All of the aforementioned applications and publications are incorporated herein by reference in their entirety.

FIELD OF THE INVENTION

The present invention is directed to electrochemical methods, and more particularly, to electrochemical methods for the production of graphene composites and electrochemical cells for conducting the same.

BACKGROUND OF THE INVENTION

Graphene is a 2D monolayer of $sp^2$-hybridized carbon atoms arranged in a honeycomb network. This material is known to have excellent physical and chemical properties for a wide variety of applications.

Graphene is synthesized through several different approaches. For instance, micromechanical cleavage techniques, liquid exfoliation techniques, epitaxial growth techniques, total organic synthesis techniques, and chemical vapor deposition techniques have all been used to varying degrees of success to form graphene.

An alternative route to bulk synthesis of graphene sheets is reduction of graphene oxide. This reduction may take place by way of a chemical reduction, a thermal reduction, or an electrochemical reduction, where the electrochemical reduction is used to produce a catalyst with the aid of a co-deposited metal and the formation of a metal nanostructure. When compared to chemical reduction, electrochemical reduction of graphene oxide is both less onerous and less detrimental to the environment. The electrochemical approach changes the electronic states of graphene oxide through the application of an external power supply, which eliminates the need for hazardous chemical reducing agents, such as hydrazine and its derivatives. The electrochemical approach also avoids contamination from excess reducing agents. However, it has only been used for the co-deposition of metals and the synthesis of nanostructure metal composites.

Electrochemical coating of graphene-metal composites on conductive substrates, such as glassy carbon, gold disks, or metal foils, has been reported and has found some utility for the fabrication of sensors, hydrogen production, and energy storage. However, incorporation of graphene into isolating substrates, i.e., non-conducting porous substrates, is much more difficult. Due to the intrinsic isolating properties of the component materials, e.g., polymer, glass, and wood, these porous substrates cannot be used in applications that require conductive materials, such as electrochemical electrodes, electronics, sensors, and switches.

Thus, a need exists for methods for creating composites of graphene on non-conductive porous substrates.

SUMMARY OF THE INVENTION

The present invention is premised on the realization that electrochemical methods could be used to form graphene composites on non-conductive porous substrates. More particularly, the present invention is premised on the realization that non-conductive porous substrates coated with graphene oxide could undergo electrochemical reduction to form such composites. Incorporating graphene into non-conducting porous substrates, such as paper, clothing fabrics, and fibers, could allow for an expansion of the available materials for development of novel electronic systems and components. Such non-conductive porous substrates have been widely used in the phase and/or size separation of certain molecules, the immobilization of enzymes or microorganisms in biotechnology, as well as in other applications.

In accordance with an embodiment of the present invention, a method of making an electrically conductive composite is provided. The method includes applying graphene oxide to at least one non-conductive porous substrate and then reducing the graphene oxide to graphene via an electrochemical reaction.

In accordance with another embodiment of the present invention, an electrochemical cell for causing a reaction that produces an electrically conductive composite is provided. The electrochemical cell includes a first electrode containing at least one layered electrocatalyst. This electrocatalyst includes at least one non-conductive porous substrate coated with graphene oxide and at least a first and second active metal layer comprising a conductive metal in contact with the non-conductive porous substrate coated with graphene oxide. The electrochemical cell further includes a second electrode, an ion conductive medium, electrical current in communication with the first electrode, and an optional third electrode having a known electrode potential.

The objects and advantages of the present invention will be further appreciated in light of the following detailed description and examples in which:

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to describe the invention.

DETAILED DESCRIPTION OF EMBODIMENTS OF THE INVENTION

Unless clearly defined otherwise from the context, any range of values presented in the following Detailed Description and Claims includes each end point as well as each whole number or fractional part thereof, within the recited range. Additionally, approximating language may be applied to modify any quantitative representation that may vary without resulting in a change in the basic function to which it is related. Accordingly, a value modified by a term or terms, such as "about" and "substantially," may not be limited to the precise value specified. By way of example, a range from "about 0.8 nm to about 50 nm," includes for example, 0.8 nm, 0.9 nm, 1 nm, 3 nm, 3.14 nm, 49.999 nm, 50 nm, etc., and may include values slightly below 0.8 nm and slightly above 50 nm.

Figure 1:
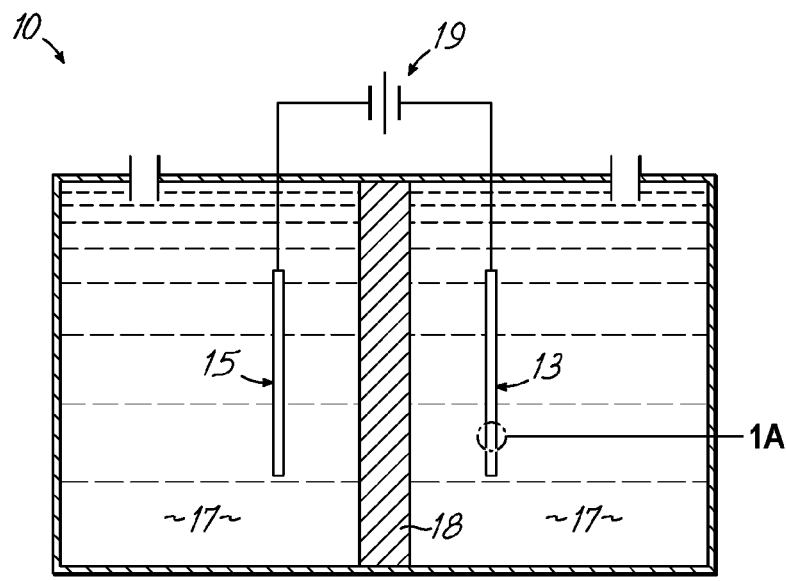
FIG. 1 is a diagrammatical view of a simplified electrochemical cell, in accordance with an embodiment of the present invention.

In accordance with an embodiment of the present invention and in reference to FIG. 1, an electrochemical cell 10 is provided that includes a first electrode 13, a second electrode 15, an ion conductive medium 17 in electrolytic communication with the first and second electrodes 13, 15, and a voltage source 19 in electrolytic communication with the first and second electrodes. The first and second electrodes 13, 15 may be physically separated by a separator 18. In a batch-type arrangement shown in FIG. 1, the ion conductive medium 17 may be stirred to facilitate mass transfer. It will be readily apparent to one of ordinary skill in the art that the above cell 10 is readily adaptable to a continuous flow cell configuration, semi-continuous, and with recirculation of the ion conductive medium 17.

Figure 1A:
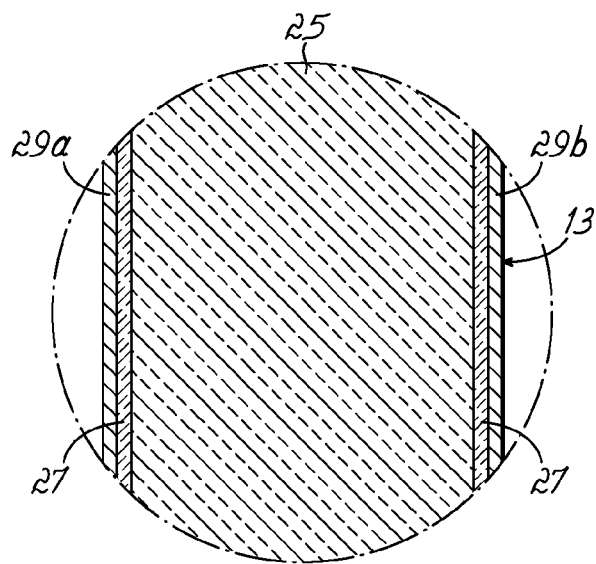
FIG. 1A is an enlarged view of the encircled portion 1A of the first electrode shown in FIG. 1, showing in cross-section the non-conductive porous substrate, graphene oxide coating material, and active metal layers, in accordance with an embodiment of the present invention.

In accordance with embodiments of the present invention and as shown in FIG. 1A, the first electrode 13 includes a non-conductive porous substrate 25 coated with graphene oxide coating 27 at least partially covering the non-conductive porous substrate 25 and also at least partially coating the inside network of the non-conductive porous substrate 25. Additionally, the first electrode 13 includes at least a first and second active metal layer 29a, 29b in contact with the non-conductive porous substrate 25 coated with a graphene oxide coating 27.

For purposes of the present invention, the non-conductive porous substrate is not particularly limited and includes anything that is not conductive, or only sparingly so, and porous, i.e., having minute spaces into which liquids and/or gases may infiltrate. Non-conductive porous substrates include fabric, articles of clothing, paper, polymer membranes and films, glass materials, wood, cotton, certain fibrous materials, and many other materials.

The materials used for active metal layers 29a, 29b are not particularly limited and may be utilized in a wide range of applications and processes. For example, the materials include, but are not limited to, platinum, iridium, rhodium, rubidium, ruthenium, rhenium, palladium, gold, silver, nickel, iron, cobalt, copper, zinc, chromium, tantalum, gallium, cadmium, indium, thallium, tin, lead, bismuth, silver, mercury, niobium, vanadium, manganese, aluminum, arsenic, selenium, antimony, titanium, tungsten, Raney metal, carbon steel, stainless steel, graphite, and mixtures and alloys thereof. In one embodiment, the active metal layers 29a, 29b comprise nickel and/or nickel oxyhydroxide. In another embodiment, the active metal layers 29a, 29b comprise a titanium in the form of a foil or a mesh. In another embodiment, the active metal layers 29a, 29b comprise nickel, manganese, cobalt, or zinc, or combinations thereof.

In accordance with an embodiment, the graphene oxide coating 27 may be one graphene oxide layer thick. In another embodiment, the graphene oxide coating 27 may be comprised of multiple graphene oxide layers. For example, the graphene oxide coating 27 may comprise 1, 2, 3, 4, or 5 or more, graphene oxide layers. Accordingly, the graphene oxide coating 27 may be comprised of 1 to about 5 layers of graphene oxide. Alternatively, the graphene oxide coating may be comprised of about 3 to about 5 layers of graphene oxide. Thus, "few layer graphene oxide sheets" as used herein may be comprised of about 2 to about 5 layers of graphene oxide. Accordingly, the graphene oxide coating may have a thickness from about 0.8 nm to about 50 nm, or about 0.9 nm to about 25 nm, or about 1 nm to about 10 nm, or about 2 nm to about 5 nm, for example.

The second electrode 15 comprising a conductor is not particularly limited and may be selected from electrodes known in the art. For instance, the second electrode 15 may comprise, but is not limited to, platinum, palladium, carbon, rhenium, nickel, Raney Nickel, iridium, vanadium, cobalt, iron, ruthenium, molybdenum, carbon steel, titanium, or combinations thereof. In some embodiments, the second electrode serves to oxidize water, and so any electrode capable of carrying out such an oxidation is appropriate for use as the second electrode. It is within the purview of one of ordinary skill in the art to select the appropriate second electrode in view of the parameters of the particular application for which the inventive system is used.

Although not shown, the electrochemical cell of the present invention may include a third electrode. This third electrode may be a reference electrode to monitor the voltage applied to the electrochemical cell, such as an Ag/AgCl electrode, an Hg/HgO electrode, a calomel electrode, or a hydrogen reversible electrode. Many reference electrodes are known and it is within the purview of one of ordinary skill in the art to select the appropriate reference electrode in view of the parameters of the particular application for which the inventive system is used.

The ion conductive medium 17 can be aqueous or non-aqueous and acidic, basic, or pH-neutral. In an embodiment, the ion conductive medium 17 comprises organic solvents or ionic liquids. In another embodiment, the ion conductive medium 17 is an aqueous, basic electrolyte solution. For example, an aqueous, basic electrolyte solution may comprise a hydroxide salt (e.g., KOH, NaOH), a carbonate salt (e.g., $K_2CO_3$, $Na_2CO_3$), a bicarbonate salt (e.g., $KHCO_3$, $NaHCO_3$), or combinations thereof. Alternatively, the ion conductive medium 17 may be an aqueous solution of sodium chloride.

The ion conductive medium 17 may have a hydroxide concentration of less than 0.1 M. For example, the pH of the ion conductive medium 17 may be in a range from about 10 to about 7. Alternatively, the ion conductive medium 17 may have a hydroxide concentration of about 0.1 M to about 5 M. In another embodiment, the ion conductive medium 17 is an aqueous, pH-neutral electrolyte solution, such as an aqueous solution of sodium chloride. In yet another embodiment, the electrolyte ion conductive medium 17 is an aqueous, acidic electrolyte solution.

In accordance with another embodiment, the ion conductive medium 17 includes a gel, such as a solid polymer electrolyte. Suitable gels include, but are not limited to, those containing polyacrylic acid, polyacrylates, polymethacrylates, polyacrylamides, and similar polymers and copolymers.

The electrolytic gel may be prepared using any suitable method. One method includes forming a polymer and then injecting a hydroxide, a carbonate or a bicarbonate salt electrolyte into the polymer to form a polymeric mixture. In another method, the monomer may be polymerized in the presence of a hydroxide, a carbonate, or bicarbonate salt electrolyte. It is within the purview of one of ordinary skill in the art to select the appropriate ion conductive medium in view of the parameters of the particular application for which the inventive system is used.

Optional separator 18 compartmentalizes the first and second electrodes 13, 15. Separators should be constructed from materials chemically resistant to the ion conductive medium 17. Many polymers are suitable for constructing separators, such as Teflon® and polypropylene. Separators are not required for simple batch-type arrangements, but may be advantageous for continuous flow electrochemical cells. Separators may include ion exchange membranes, solid electrolytes, or the above electrolytic gels, for example. Separators may be permeable, semi-permeable or impermeable to gases or liquids.

Voltage source 19 may be any available source, such as batteries, fuel cells, power from the grid, and renewable energy sources, such as a solar cell or a wind-turbine generator, for example. The voltage source 19 is in electrolytic communication with the first and second electrodes 13, 15, and provides a voltage difference sufficient to reduce the graphene oxide to graphene.

In accordance with another embodiment of the present invention, a method of making an electrically conductive composite is provided. The method comprises applying graphene oxide to at least one non-conductive porous substrate. Graphene oxide is then reduced to graphene via an electrochemical reaction. This method may be performed in the electrochemical cell described above, for example.

The graphene oxide may be applied to the non-conductive porous substrate by a variety of means. For instance, the graphene oxide may be applied by spraying, ultrasonic spraying, dip coating, spinning, printing, soaking, rolling, or any other acceptable means. It is within the purview of one of ordinary skill in the art to select the appropriate method of applying the graphene oxide in view of the parameters of the particular application for which the inventive system is used.

Graphene oxide may be applied to the non-conductive porous substrate with a loading sufficient to provide an increase of the electronic conductivity of the material. This loading is expected to vary with the porosity and thickness of the substrate. Exemplary loadings of graphene oxide in 0.1 mg/cm$^2$ and 1 mg/cm$^2$. It is within the purview of one of ordinary skill in the art to select the appropriate loading of the graphene oxide in view of the parameters of the particular application for which the inventive system is used.

During the electrochemical reaction, a potential is applied to the electrochemical cell. The applied potential may range from about −0.1 V to about −5 V or from about −0.5 V to about −4 V or from about −1 V to about −3 V or from about −1.1 V to about −1.5 V. the applied potential may be about −1.2 V, for example. This potential may be applied for about 1 second to about 120 minutes or from about 1 minute to about 60 minutes. The potential may be applied for 35 minutes or 55 minutes, for example. The actual amount of time required depends on the loading, porosity, and size of the electrochemical cell. For instance, if the sample is very small, the time required may be on the order of seconds, but if the sample is very large, the time required may be on the order of hours. It is within the purview of one of ordinary skill in the art to select the appropriate potential to apply and the time of the application of that potential to effect the desired level of reduction of the graphene oxide.

The present invention will be further appreciated in view of the following examples.

EXAMPLES

Filter paper was cut into 1.5 cm×1.5 cm pieces, rinsed with deionized water (DI water), then dried at 70° C. overnight in a model 30 GC lab oven (Quincy Lab Inc.). Commercial graphene oxide suspension was purchased from Angstron Materials (Batch #S2110514). The commercial graphene oxide suspension was diluted to 0.1 mg/ml with DI water and sonicated for 10 minutes (Branson 2800 Ultrasonic Cleaner). Then, the diluted graphene oxide suspension was sprayed onto the previously cut filter paper substrates using an airbrush (TCP Global) with Ar gas (Praxair) at about 70° C. on a hot plate (Corning PC-620D) to accelerate water evaporation.

The electrochemical reduction was performed in a three-electrode electrochemical cell. The graphene oxide coated filter paper substrates were sandwiched with two titanium foils and used as working electrodes. Plastic insulators, which are resistant to the electrolyte, are used to hold or press the titanium foils to the edges of the graphene oxide coated filter paper. An Ag/AgCl electrode and platinum foil were used as the reference electrode and counter electrode, respectively. A potential of −1.2 V vs. Ag/AgCl was applied for the reduction of graphene oxide in 1 M NaCl. The reduction times for the three electrodes of varying loading are listed in Table 1. After electrochemical reduction, the graphene coated filter paper substrates were rinsed with DI water and dried at 70° C., then weighed to obtain the graphene loading. This value is reported as graphene loading in Table 1.

TABLE 1

| Electrode | Reduction Time (min) | Graphene Loading (mg/cm$^{2)}$) |
|---|---|---|
| a | 35 | 0.05 |
| b | 35 | 0.18 |
| c | 35 | 0.58 |

Figure 2:
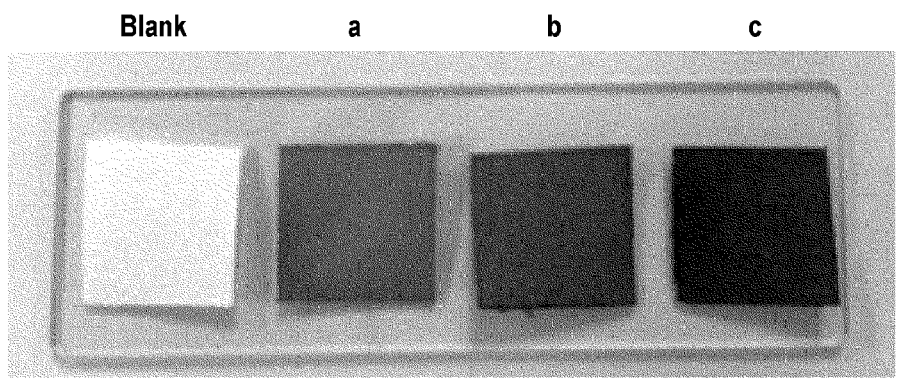
FIG. 2 shows photographs of the graphene oxide coated filter paper example, in accordance with an embodiment of the present invention.
Figure 3:
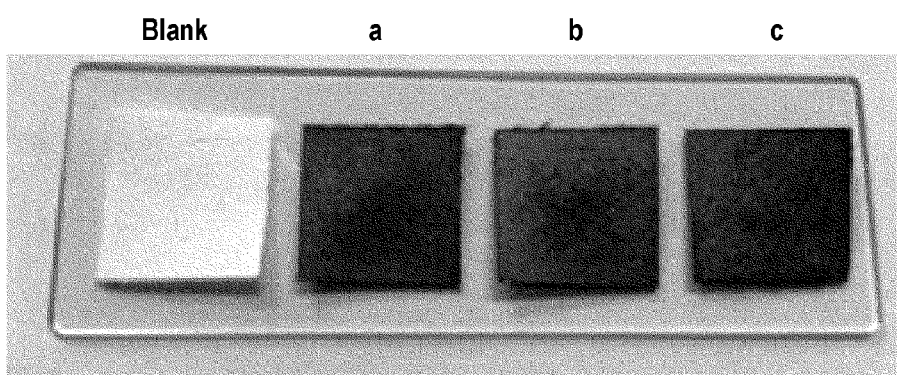
FIG. 3 shows photographs of the graphene coated filter paper, in accordance with an embodiment of the present invention.

The graphene oxide coated filter paper samples with varying loadings are shown in FIG. 2, while FIG. 3 shows the same samples after electrochemical reduction. As shown in the figures, the filter paper becomes brown upon coating with graphene oxide and black after the electrochemical reduction.

Figure 4:
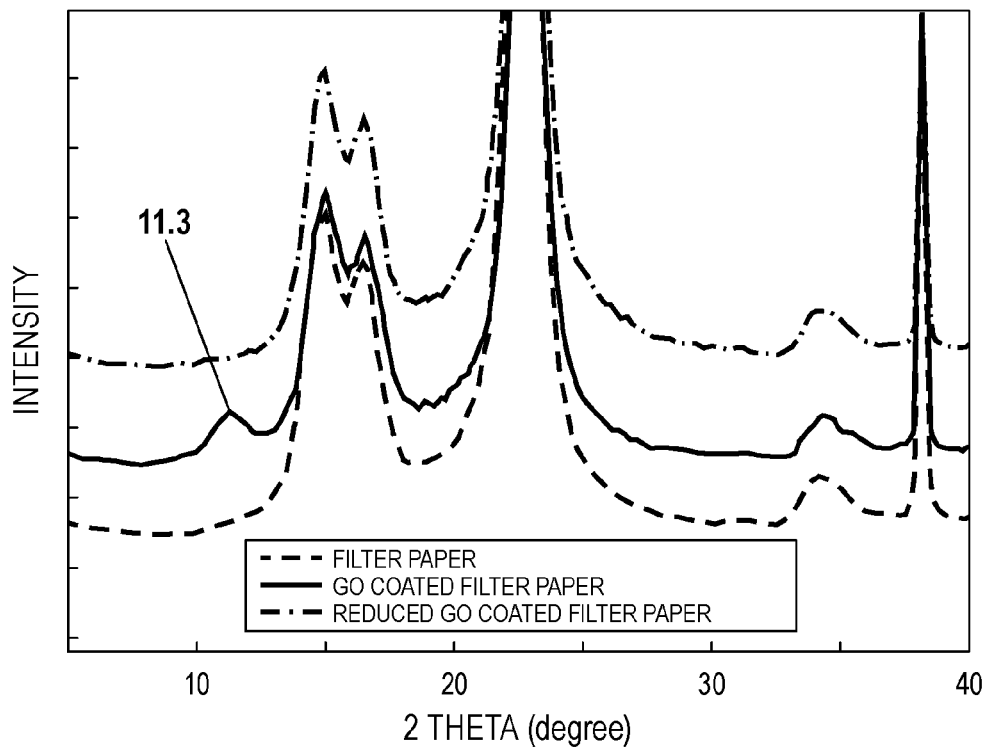
FIG. 4 shows the X-Ray diffraction data from a filter paper, a graphene oxide coated filter paper, and a graphene coated filter paper, in accordance with an embodiment of the present invention.

The samples were characterized by X-Ray diffraction analysis, as shown in FIG. 4, both after coating with graphene oxide and after the electrochemical reduction. The peak at 11.3° in the curve obtained from the analysis of the graphene oxide coated filter paper is correlated to the interlayer spacing between the graphene oxide nanosheets. Thus, the disappearance of this peak at 11.3° in the curve obtained from the analysis of the electrochemically reduced sample indicates the reduction of graphene oxide to graphene. Due to the huge diffraction peak of the filter paper at about 20° to about 25°, the anticipated (002) reflection of graphene at around 23° cannot be distinguished.

Figure 5:
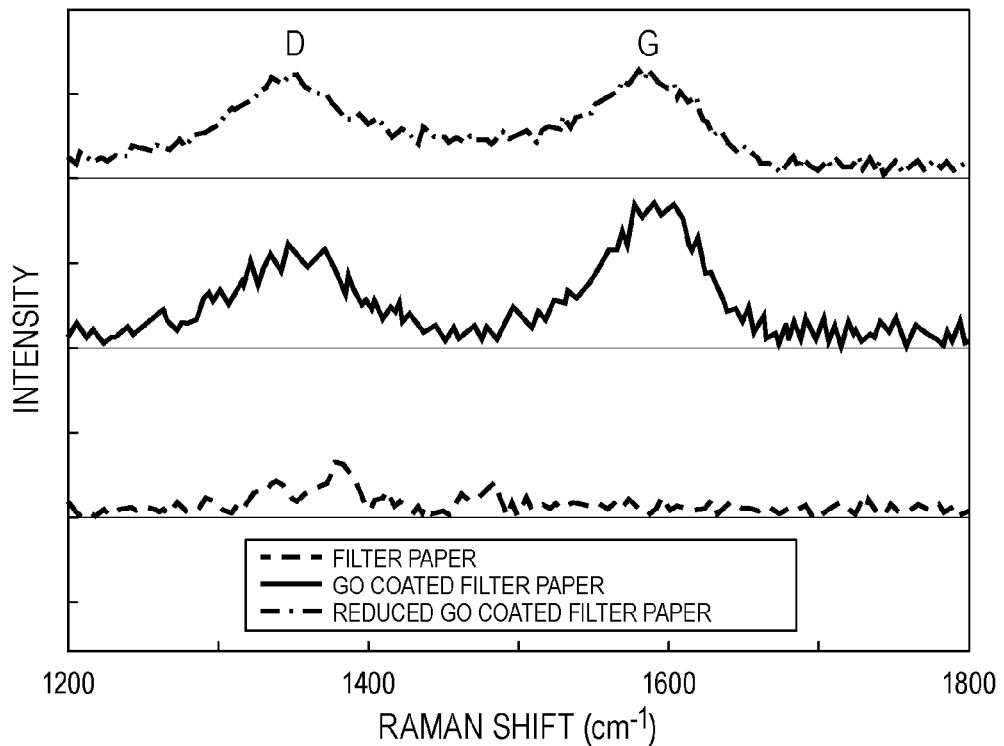
FIG. 5 shows the Raman spectroscopy data from a filter paper, a graphene oxide coated filter paper, and a graphene coated filter paper, in accordance with an embodiment of the present invention.

Similarly, the samples were characterized by Raman spectroscopy, as shown in FIG. 5. The Raman spectra of both the graphene oxide coated filter paper and the graphene composite on filter paper exhibit the D and G bands at around 1350 $cm^{-1}$ and 1600 $cm^{-1}$, respectively. The intensity ratio of the D band to the G band in the curve obtained from the graphene composite sample is increased relative to that of the curve obtained from the graphene oxide coated sample. The increased D/G intensity ratio in the Raman spectra is consistent with significant structural changes in the electrochemically reduced sample, suggesting the reduction of graphene oxide.

The samples were further characterized as to their conductivity and resistance via a two probe multimeter with a 1 cm distance between the two probes. The filter paper and GO coated filter paper are isolating. However, after electrochemical reduction, the composites become conducting, as shown in Table 2. Table 2 further shows that the resistance of the composite decreases as the loading of graphene increases.

TABLE 2

| Electrode | Graphene Loading ($mg/cm^2$) | Resistance before reduction (kSΩ) | Resistance after reduction (kSΩ) |
|---|---|---|---|
| Control | 0 | >211,000 | >211,000 |
| a | 0.05 | >211,000 | 6.6 |
| b | 0.18 | >211,000 | 1.2 |
| c | 0.58 | >211,000 | 0.78 |

Figure 6:
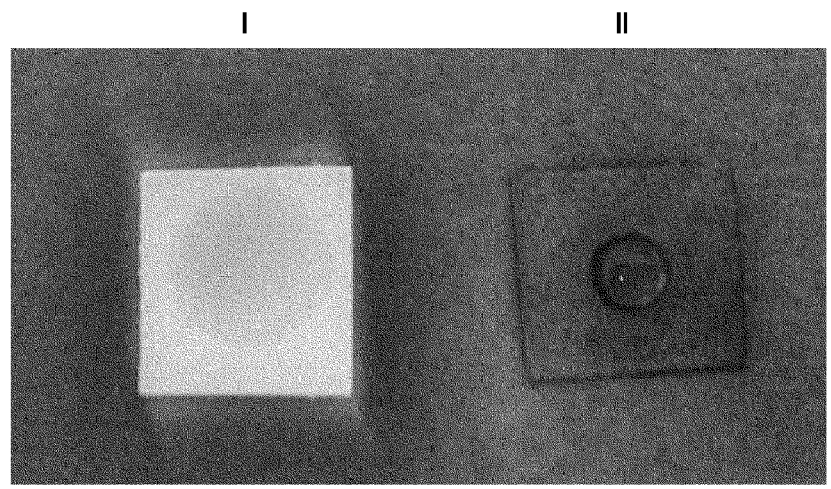
FIG. 6 shows a photograph of the results obtained from a qualitative hydrophobicity experiment performed using filter paper and a graphene coated filter paper, in accordance with an embodiment of the present invention.

Finally, the relative hydrophobicity of the uncoated filter paper and a graphene composite in accordance with the above discussion was determined qualitatively by dropping a drop of water on each sample. As shown in FIG. 6, the uncoated filter paper (I) absorbs water, while the water drop is repelled by the graphene composite (II). Thus, the graphene composite is hydrophobic.

While the present invention was illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method, and illustrative examples shown and described. Accordingly, departures may be made from such details without departing from the scope of the general inventive concept embraced by the following claims.

What is claimed is:

1. A method of making an electrically conductive composite comprising:

applying graphene oxide to at least one non-conductive porous substrate; and reducing the graphene oxide to graphene via an electrochemical reaction, the electrochemical reaction takes place in an electrochemical cell, the electrochemical cell comprising:

a first electrode comprising at least one layered electrocatalyst, wherein the at least one layered electrocatalyst comprises:

the at least one non-conductive porous substrate coated with graphene oxide;

at least a first active metal layer and a second active metal layer, the first active metal layer and the second active metal layer each comprising a conductive metal in contact with the at least one non-conductive porous substrate coated with graphene oxide, wherein the first active metal layer is positioned on a first portion of the at least one non-conductive porous substrate coated with graphene oxide and the second active metal layer is positioned on a second portion of the at least one non-conductive porous substrate coated with graphene oxide, the first portion opposing the second portion;

a second electrode comprising a conductor;

an ion conductive medium; and electrical current in communication with the first electrode, wherein the first and second active metal layers are in electronic communication with the ion conductive medium.

2. The method of claim 1, wherein the applying graphene oxide is effected by at least one of spraying, ultrasonic spraying, dip coating, spinning, printing, soaking, or rolling.

3. The method of claim 1, wherein the at least one non-conductive porous substrate is a fabric, an article of clothing, a paper, a polymer membrane, a polymer film, a glass, a wood, cotton, or a fibrous material.

4. The method of claim 1, wherein the electrochemical cell further comprises a third electrode having a known electrode potential.

5. The method of claim 1, wherein the at least one non-conductive porous substrate is a fabric, an article of clothing, a paper, a polymer membrane, a polymer film, a glass, a wood, or cotton.

6. The method of claim 1, wherein the ion conductive medium has an acidic or a neutral pH.

7. The method of claim 1, wherein the ion conductive medium has a basic pH.

8. The method of claim 1, wherein the ion conductive medium is an aqueous solution of sodium chloride.

9. The method of claim 1, wherein the electrochemical cell further comprises a third electrode is an Ag/AgCl electrode, an Hg/HgO electrode, a calomel electrode, or a hydrogen reversible electrode.

* * * * *